(12) United States Patent
Kuvettu et al.

(10) Patent No.: US 10,449,524 B2
(45) Date of Patent: Oct. 22, 2019

(54) PROCESS AND COMPOSITION FOR PREPARATION OF CRACKING CATALYST SUITABLE FOR ENHANCING LPG

(71) Applicant: Indian Oil Corporation Limited, Bandra (East), Mumbai (IN)

(72) Inventors: Mohan Prabhu Kuvettu, Faridabad (IN); Mahesh Kadgaonkar, Faridabad (IN); Biswanath Sarkar, Faridabad (IN); Velusamy Chidambaram, Faridabad (IN); Arumugam Velayutham Karthikeyani, Faridabad (IN); Alex Pulikottil, Faridabad (IN); Jayaraj Christopher, Faridabad (IN); Brijesh Kumar, New Delhi (IN); Biswapriya Das, Faridabad (IN)

(73) Assignee: Indian Oil Corporation Limited, Mumbai (IN)

( * ) Notice: Subject to any disclaimer, the term of this patent is extended or adjusted under 35 U.S.C. 154(b) by 232 days.

(21) Appl. No.: 15/237,121

(22) Filed: Aug. 15, 2016

(65) Prior Publication Data

US 2017/0056865 A1 Mar. 2, 2017

(30) Foreign Application Priority Data

Aug. 24, 2015 (IN) .......................... 3228/MUM/2015

(51) Int. Cl.
| | | |
|---|---|---|
| *B01J 29/06* | (2006.01) | |
| *B01J 29/40* | (2006.01) | |
| *B01J 37/02* | (2006.01) | |
| *B01J 37/10* | (2006.01) | |
| *B01J 37/30* | (2006.01) | |
| *B01J 37/06* | (2006.01) | |
| *B01J 29/24* | (2006.01) | |
| *B01J 29/46* | (2006.01) | |
| *B01J 29/68* | (2006.01) | |
| *B01J 29/76* | (2006.01) | |
| *B01J 29/80* | (2006.01) | |
| *B01J 37/00* | (2006.01) | |
| *C10G 11/05* | (2006.01) | |
| *C10G 11/18* | (2006.01) | |
| *B01J 37/08* | (2006.01) | |
| *B01J 37/28* | (2006.01) | |
| *B01J 29/08* | (2006.01) | |
| *B01J 35/00* | (2006.01) | |

(52) U.S. Cl.
CPC .............. *B01J 29/40* (2013.01); *B01J 29/24* (2013.01); *B01J 29/46* (2013.01); *B01J 29/68* (2013.01); *B01J 29/7615* (2013.01); *B01J 29/7653* (2013.01); *B01J 29/7661* (2013.01); *B01J 29/7669* (2013.01); *B01J 29/7692* (2013.01); *B01J 29/80* (2013.01); *B01J 37/009* (2013.01); *B01J 37/0045* (2013.01); *B01J 37/0201* (2013.01); *B01J 37/06* (2013.01); *B01J 37/08* (2013.01); *B01J 37/10* (2013.01); *B01J 37/30* (2013.01); *C10G 11/05* (2013.01); *C10G 11/18* (2013.01); *B01J 29/06* (2013.01); *B01J 29/084* (2013.01); *B01J 35/002* (2013.01); *B01J 35/0026* (2013.01); *B01J 37/28* (2013.01); *B01J 2229/186* (2013.01); *B01J 2229/20* (2013.01); *B01J 2229/38* (2013.01); *B01J 2229/42* (2013.01); *B01J 2523/00* (2013.01); *C10G 2400/02* (2013.01); *C10G 2400/20* (2013.01)

(58) Field of Classification Search
CPC . B01J 29/072; B01J 29/24; B01J 29/46; B01J 29/68; B01J 29/7615; B01J 29/7692; B01J 29/076; B01J 29/26; B01J 29/48; B01J 29/69; B01J 29/7815; B01J 29/7892; B01J 2229/10; B01J 2229/186; B01J 2229/36; B01J 2229/40; B01J 2229/42; B01J 37/0009; B01J 37/0201; B01J 37/10; B01J 37/28; B01J 37/30; B01J 37/0018; B01J 29/7661; B01J 29/40; B01J 29/80
USPC ... 502/60, 63, 64, 68, 69, 70, 71, 77, 78, 67
See application file for complete search history.

(56) References Cited

U.S. PATENT DOCUMENTS

| | | |
|---|---|---|
| 3,847,793 A | 11/1974 | Schwartz et al. |
| 4,309,280 A | 1/1982 | Rosinski et al. |
| 4,522,705 A | 6/1985 | Chu et al. |
| 4,549,956 A | 10/1985 | Chu |
| 4,614,578 A | 9/1986 | Chester et al. |
| 4,784,745 A | 11/1988 | Nace |
| 4,803,185 A | 2/1989 | Miller et al. |
| 4,818,738 A | 4/1989 | Chu et al. |
| 4,828,679 A | 5/1989 | Cormier, Jr. et al. |
| 4,867,863 A | 9/1989 | Herbst et al. |

(Continued)

FOREIGN PATENT DOCUMENTS

| | | |
|---|---|---|
| CA | 2156607 A1 | 9/1994 |
| EP | 0643621 B1 | 8/1997 |

*Primary Examiner* — Elizabeth D Wood
(74) *Attorney, Agent, or Firm* — Workman Nydegger

(57) ABSTRACT

The present invention relates to a catalyst product for cracking of heavy hydrocarbon feed stocks predominantly in to light olefins and processes for preparing the catalyst. More specifically the present invention relates to a process of preparing Fluidic Catalytic Cracking (FCC) catalyst additive composition. The FCC catalyst additive composition of the present invention is a LPG selective catalyst particles comprising a medium pore zeolite bonded with clay-phosphate-silica-alumina binder. The catalyst of the present invention exhibits improved selectivity towards high value components like propylene and gasoline and suppressing low value components like dry gas and bottoms.

5 Claims, No Drawings

(56) References Cited

U.S. PATENT DOCUMENTS

| | | | |
|---|---|---|---|
| 4,927,523 | A | 5/1990 | Donnelly |
| 4,927,526 | A | 5/1990 | Anderson et al. |
| 4,983,276 | A | 1/1991 | Absil et al. |
| 4,997,545 | A | 3/1991 | Krishna et al. |
| 5,039,640 | A | 8/1991 | Absil et al. |
| 5,051,164 | A | 9/1991 | Herbst et al. |
| 5,055,437 | A | 10/1991 | Herbst et al. |
| 5,151,394 | A | 9/1992 | Chitnis et al. |
| 5,190,902 | A | 3/1993 | Demmel |
| 5,286,369 | A | 2/1994 | Roberie et al. |
| 5,302,567 | A | 4/1994 | Miller et al. |
| 5,348,643 | A | 9/1994 | Absil et al. |
| 5,372,704 | A | 12/1994 | Harandi et al. |
| 5,779,882 | A | 7/1998 | Chester et al. |
| 5,846,402 | A | 12/1998 | Mandal et al. |
| 5,997,728 | A | 12/1999 | Adewuyi et al. |
| 6,137,022 | A | 10/2000 | Kuechler et al. |
| 6,156,947 | A | 12/2000 | Vora |
| 6,258,257 | B1 | 7/2001 | Swan et al. |
| 6,613,710 | B2 | 9/2003 | Ray et al. |
| 6,677,263 | B2 | 1/2004 | Wang et al. |
| 7,459,413 | B2 | 12/2008 | Shen et al. |
| 7,485,595 | B2 | 2/2009 | Long et al. |
| 7,517,827 | B2 | 8/2009 | Ravichandran et al. |
| 9,278,342 | B2 | 3/2016 | Ghosh |
| 2013/0203586 | A1* | 8/2013 | Stamires ............... B01D 53/94 502/68 |
| 2014/0051901 | A9* | 2/2014 | Dath .................... B01J 29/40 585/653 |

\* cited by examiner

PROCESS AND COMPOSITION FOR PREPARATION OF CRACKING CATALYST SUITABLE FOR ENHANCING LPG

FIELD OF THE INVENTION

The present invention relates to a catalyst product for cracking of heavy hydrocarbon feed stocks predominantly in to light olefins and processes for preparing the catalyst. More specifically the present invention relates to a process of preparing Fluidic Catalytic Cracking (FCC) catalyst additive composition. The FCC catalyst additive composition of the present invention is a LPG selective catalyst particles comprising a medium pore zeolite bonded with clay-phosphate-silica-alumina binder. The catalyst of the present invention exhibits improved selectivity towards high value components like propylene and gasoline and suppressing low value components like dry gas and bottoms.

BACKGROUND OF THE INVENTION

Catalytic cracking is widely used today to reduce heavy hydrocarbons into lighter and more useful products. One commonly used cracking catalyst is a type of crystalline inorganic synthetic products called "Y zeolites." The Y zeolites typically contain silica having discrete pores in the range 6.5 to 13.5 Å. The Y zeolites also have higher surface area and acidity as compared to other types of catalyst such as amorphous silica-alumina based catalysts. As a result, Y zeolites can generate improved catalytic activity and selectivity towards gasoline.

When preparing Y zeolites, retaining catalytic activity can be difficult. For example, the Y zeolites can be sensitive to extreme pH conditions and other process conditions. Current solutions include using basic phosphate source to improve catalytic activity of the catalyst, but at the same time, attrition resistance of the catalyst has to be sacrificed. Hence, there is a need to develop a process for maintaining catalytic activity of high silica zeolites without sacrificing attrition resistance and apparent bulk density (ABD) of resulting catalyst.

U.S. Pat. No. 3,847,793 describes a process for conversion of hydrocarbons with a dual cracking component catalyst comprising ZSM-5 zeolite based catalyst and large pore zeolite based catalyst.

U.S. Pat. No. 6,258,257 refers to a process for producing polypropylene from $C_3$ olefins by a two-stage fluid catalytic cracking process having two types of catalysts made from zeolites of large pore and medium pore.

U.S. Pat. No. 6,137,022 discloses a process of making an olefin product from an oxygenated feedstock by contacting the feedstock in a reaction zone containing 15 volume percent or less of a catalyst, preferably a catalyst comprising a silica-alumina-phosphate molecular sieve.

EP 0167325A3 relates to higher make-p of catalyst that may contain 2 or 3 times the amount of ZSM-5 sought for the equilibrium catalyst.

U.S. Pat. No. 6,156,947 refers to a process for jointly producing butene-1 and ether in a catalytic distillation column, which comprises an upper catalytic zone for etherification and a lower catalytic zone for isomerization of $C_3$ to $C_4$ olefins and conversion of butadiene.

U.S. Pat. No. 5,997,728 refers to a process for catalytically cracking of a heavy feed in a FCC unit, with large amounts of shape selective cracking additive. The catalyst inventory preferably contains at least 10 wt % additive, of 12-40% ZSM-5 on an amorphous support, equivalent to more than 3.0 wt % ZSM-5 crystal circulating with equilibrium catalyst. This process yields large amount of light olefins, without excessive production of aromatics, or loss of gasoline yield.

U.S. Pat. No. 4,309,280 describes a process for maximizing of LPG by adding very small amounts of powdered, neat ZSM-5 catalyst, characterized by a particle size below 5 microns to the FCC catalyst inventory.

U.S. Pat. No. 5,190,902, CA2156607A1 and CP 0643621B1 refer to a processes for the preparation of attrition resistant hinder particles by spray drying of clay phosphate slurry and ZSM-5 zeolite with adjusted extreme pH conditions, calcination.

U.S. Pat. No. 5,286,369 describes a aluminum phosphate binder for binding various zeolites, prepared by reaction between aluminum nitrate and phosphoric acid, while $3HNO_3$ is a undesired product detrimental to zeolite performance.

U.S. Pat. No. 4,803,185 is directed to providing an octane boosting catalyst containing a composite of an intermediate pore non-zeolitic molecular sieve (NZMS) in combination with another non-zeolitic molecular sieve having the same framework structure.

U.S. Pat. No. 4,522,705. Octane and total yield improvement in catalytic cracking of petroleum fractions under cracking conditions can be obtained by adding to conventional cracking catalysts small amounts of an additive catalyst comprising a class of zeolites characterized by a silica to alumina mole ratio greater than 5 and a Constraint Index of 1 to 12 wherein the zeolite additive catalyst is prepared via in-situ crystallization of preformed aggregates.

U.S. Pat. No. 4,549,956 refers to a Addition of AgHZSM-5 to conventional cracking catalysts results in a significant increase in gasoline octane without undue loss in gasoline yield. This octane increase is greater than could be achieved by adding HZSM-5.

U.S. Pat. No. 4,614,578 refers to octane and total yield improvement in catalytic cracking processes by the addition to conventional cracking catalysts of very small amounts of additive catalyst comprising a class of zeolites characterized by silica to alumina mole ratio greater than about 12 and a constraint index of about 1 to 12. The additive catalyst is added to the conventional cracking catalyst in the cracking process in an amount which provides the zeolite component of the additive catalyst at from about 0.01 weight percent to about 1.0 weight percent of the conventional cracking catalyst in the cracking process.

U.S. Pat. No. 4,784,745 relates to a catalyst and a process for enhancing gasline octane number of gasoline, wherein said shape-selective zeolite is selected from the group having the structure of ZSM-5, ZSM-11, ZSM-12, ZSM-23, ZSM-34, ZSM-35, ZSM-38, ZSM-48, ZSM-50, TMA Offretite and Erionite.

U.S. Pat. No. 4,818,738 relates to a octane and improvement in catalytic cracking processes by the addition to conventional cracking catalysts of small amounts of additive catalyst comprising a class of zeolites characterized by a silica to alumina mole ratio greater than about 12 and a Constraint Index of about 1 to 12 bound in a matrix chosen such that the matrix component forms a thermodynamically favored compound with selected cations. Sustained catalytic activity is achieved by pre-exchanging the catalyst to a high level of selected cation loading.

U.S. Pat. No. 4,828,679 relates to octane and total yield improvement in catalytic cracking of petroleum fractions under cracking conditions by adding to conventional cracking catalysts small amounts of an additive catalyst comprising a class of zeolites characterized by a silica to alumina mole ratio greater than 12 and a constraint index of 1 to 12 wherein the zeolite additive catalyst has a crystal size of between 0.2 to 10 microns.

U.S. Pat. No. 4,867,863 deals with a Resid catalytic cracking process utilizing ZSM-5 for increased gasoline octane.

U.S. Pat. No. 4,927,523 relates to a method of adding an additive zeolite having a constraint index of 1-12 to a catalytic cracking unit wherein a heavy feed is added at a given feed rate to a catalytic cracking unit and contacts a source of hot, regenerated equilibrium catalytic cracking catalyst to produce cracked products including gasoline having an octane number.

U.S. Pat. No. 4,927,526 refers to a modified ZSM-5 type zeolite catalyst prepared by controlled aging in a moving bed catalytic cracking unit. The modified catalyst exhibits significant olefin isomerization activity and reduced paraffin cracking activity.

U.S. Pat. No. 4,983,276 refers to a process with increased octane number and increased $C_{5+}$ gasoline content by employing a cracking catalyst composition containing both a large pore crystalline zeolite component and an MCM-22 zeolite component.

U.S. Pat. No. 4,997,545 relates to a process for the catalytic cracking of hydrocarbon oil feed which comprises contacting said feed under catalytic cracking conditions with a cracking catalyst in the presence of an additive comprising a basic nitrogen compound, to effect a shift in yield distribution from a maximum gasoline mode to a maximum middle distillate mode of operation.

U.S. Pat. No. 5,039,640 refers to a catalyst composition comprising of large pore crystalline molecular sieve component and an MCM-22 zeolite for catalytic cracking of a hydrocarbon oil to provide a product of increased octane number and increased $C_{5+}$ gasoline content.

U.S. Pat. No. 5,051,164 connects to catalyst compositions of inorganic oxide bound shape-selective porous crystalline silicates for improved hydrothermal stability and octane enhancement prepared by adding binder precursors to a porous crystalline silicate reaction mixture which contains unincorporated silica, in-situ formed porous crystalline silicate and water.

U.S. Pat. No. 5,055,437 deals with multi-component catalyst mixture having Ga in ZSM-5 and process for catalytic cracking of heavy hydrocarbon feed to lighter products.

U.S. Pat. No. 5,151,394 refers to a catalyst composition comprising a catalytic molecular sieve material and a matrix material comprising boron phosphate compound.

U.S. Pat. No. 5,302,567 relates to a FCC catalyst additive for the catalytic cracking of hydrocarbons wherein said catalyst comprises a conventional cracking catalyst dispersed in an inorganic matrix and a zeolite additive composition comprising a medium-pore zeolite selected from the group consisting of ZSM-5, ZSM-11, ZSM-12, ZSM-23, ZSM-35, and ZSM-38 to improve the octane number of the gasoline-range product of an FCC process.

U.S. Pat. No. 5,348,643, relates to a process for converting feedstock hydrocarbon compounds over a catalyst composition comprising clay and a zeolite component, at least one of which has been treated with a phosphorus-containing compound, which is spray dried at a low pH, to produce high octane gasoline and increased lower olefins, especially propylene and butylene.

U.S. Pat. No. 5,372,704 relates to a process and apparatus for low cracking or recracking of liquid hydrocarbons with FCC catalyst containing 0.2 to 1.5 wt % coke.

U.S. Pat. No. 5,779,882 refers to a layered composition from modified MCM-56 to offer improved gasoline yield/ octane relationship, an improved coke selectivity and a higher combined gasoline and potential alkylate yield than an identical catalyst containing unmodified MCM-56 of matter.

U.S. Pat. No. 5,846,402 relates to a process for selective catalytic cracking of a petroleum-based feedstock to produce a product having a high yield of liquified petroleum gas (LPG) and light olefins having 3 to 4 carbons.

U.S. Pat. No. 5,997,728, refers to a process for cracking of heavy feed in an FCC unit, to enhance light olefins, without excessive production of aromatics, or loss of gasoline yield with large amounts of shape selective cracking additive preferably at least 10 wt % additive, of 12-40% ZSM-5 on an amorphous support, equivalent to more than 3.0 wt % ZSM-5 crystal circulating with equilibrium catalyst.

U.S. Pat. No. 6,613,710 deals with a process for preparing bi-functional catalyst comprising of molecular sieves, modified clay and semi-basic alumina for effective cracking of high boiling petroleum feedstock to provide simultaneously, enhanced yields of Liquefied Petroleum Gas (LPG) and reduction of undesirable bottoms.

U.S. Pat. No. 6,677,263, discloses a catalytic promoter comprising of 5-65 wt % of modified HZSM-5 zeolite with Zn, P, Ga, Al, Ni and rare earth elements in an amount 0.01-10.37 wt % based on total weight of HZSM-5 zeolite to increase gasoline octane number and an increased lower olefin yield.

U.S. Pat. No. 7,459,413 discloses a catalyst and a process for its preparation and its use in cracking heavy feedstocks. The catalyst comprises one or more zeolites having controlled silica to alumina ratio and preferably treated with alkali in the presence of a matrix component selected from the group consisting of clays, synthetic matrix other than pillared clay, and mixtures thereof. The catalyst is particularly useful in treating heavy feedstock such as residues from oil sands processing.

U.S. Pat. No. 7,485,595 discloses a molecular sieve-containing catalyst for cracking hydrocarbons, comprising molecular sieve, refractory inorganic oxide, clay and a metal component, wherein the amount of said molecular sieve is from 1 to 90% by weight, the refractory inorganic oxide is from 2 to 80% by weight, the clay is from 2 to 80% by weight, and the metal component is from 0.1 to 30% by weight, calculated as the oxide of said metal having its maximum valence state, based on the total amount of the catalyst, wherein said metal component exists essentially in a reduction state and is one or more metals selected from the group consisting of metals of Group IIIA (other than aluminum), and metals of Group IVA, VA, IB, IIB, VB, VIB and VIIB, and non-noble metals of Group VIII of the periodic table. The catalyst has higher cracking activity and higher sulfur reduction activity.

U.S. Pat. No. 7,517,827 relates to a cracking catalyst composition for cracking heavy hydrocarbon and processes for preparing the catalyst. The process can include treating zeolite with sodium free basic compound with or without phosphate, treating an alumina with a dilute acid, acidifying a colloidal silica, preparing a fine slurry of clay with a source of phosphate, adding alumina slurry and/or acidified colloidal silica to clay phosphate slurry, adding treated zeolite and spray-drying the slurry and calcining the same to obtain a cracking catalyst having adequate ABD and attrition resistance property.

U.S. Pat. No. 9,278,342 discloses a method of modifying a phosphorus-treated zeolite catalyst is carried out by contacting an unbound and calcined phosphorus-treated pentasil zeolite with water in a water treatment wherein at least a portion of the water is in a liquid phase. The water treatment is sufficient to remove at least 80% by weight or more of phosphorus from the phosphorus-treated zeolite and provide an increase in the pore volume of the zeolite by at least 50% prior to the water treatment to form a modified phosphorus-treated zeolite catalyst. A zeolite catalyst is also provided in the form of a phosphorus-containing pentasil zeolite having a phosphorus content of 7.5% or less by weight of zeolite and a $^{27}$Al MAS NMR peak at 50 ppm that is greater than any other $^{27}$Al MAS NMR and a pore volume of 0.2 ml/g or more.

The ZSM-5 additive described in the above prior art use phosphate to stabilize the acid sites of ZSM-5 zeolite as well as acts as a binder to improve the Apparent Bulk Density (ABD) and Attrition Resistance (AI) of ZSM-5 additive. Therefore during preparation of ZSM-5 additive, always there will be presence of excess phosphate in the final additive formulation which has a detrimental effect on active component of Y zeolite present in the FCC catalyst.

None of the above prior arts disclose removal of excess phosphate present in the additive formulation which has a detrimental effect on active component of Y zeolite present in the FCC catalyst to improve high value product selectivity.

SUMMARY OF THE INVENTION

Accordingly, the main embodiment of the present invention provides a process for preparing a Fluidic Cracking Catalyst (FCC) catalyst additive composition for cracking heavy hydrocarbon, said process comprising the steps of:
(a) slurrying of a conventional FCC catalyst additive in demineralised water at a temperature of 25° C. to 99° C. for 30 mins.-to 2 hrs for solubilising un-reacted phosphate;
(b) filtering the phosphate depleted FCC catalyst additive;
(c) drying and calcinating the FCC catalyst additive of step (b);
(e) exchanging of the FCC catalyst additive of step (d) with the solution of bivalent metals from group consisting of Group IIA or Group IB at a temperature of 60-80° C.;
(f) filtering the metal exchanged FCC catalyst additive;
(g) drying and calcinating the metal exchanged FCC catalyst additive of step (f); and
(h) obtaining FCC catalyst additive composition.

Another embodiment of the present invention provides a product of FCC catalyst additive having the following composition:
(a) zeolite from 1 wt % to 65 wt %; (b) clay from 10 wt % to 75 wt %; (c) silica from 25 wt % to 80 wt %; (d) alumina from 20 wt % to 70 wt %; (e) phosphate from 4 wt % to 23 wt %; and (f) Group-IIA and Group IB metals from 0.1 to 1 wt %.

Another embodiment of the present invention provides a process as herein described wherein the heavy hydrocarbons consist of LPG and gasoline.

Another embodiment of the present invention provides a process as herein described wherein in the step (a) the reaction is preferably carried out of at a temperature of 80° C. for 2 hrs.

Another embodiment of the present invention provides a process as herein described wherein the metals impregnated in metal impregnation step (e) consist of Nickel at a concentration of 2800 ppm and Vanadium at a concentration of 6500 pm.

Another embodiment of the present invention provides a process as herein described wherein step (a) removes excess of soluble phosphate in the range of 5 to 10 wt %.

Another embodiment of the present invention provides a process as herein described wherein step (a) the FCC to water ratio in the range of 1:10 to 10:1.

Another embodiment of the present invention provides a process as herein described wherein the FCC catalyst additive is a conventional catalyst having pentasil family zeolite selected from ZSM-5, ZSM-11, ZSM-12, ZSM-23, ZSM-35, ZSM-38, ZSM-48, ZSM-57, Zeolite beta, and mordenite.

Another embodiment of the present invention provides a process as herein described the FCC catalyst additive selected for removal of excess phosphate is having following:
(a) zeolite from 1 wt % to 65 wt %; (b) clay from 10 wt % to 75 wt %; (c) silica from 25 wt % to 80 wt %; (d) alumina from 20 wt % to 70 wt %; and (e) phosphate from 5 wt % to 25 wt %.

Another embodiment of the present invention provides a process as herein described wherein the FCC catalyst additive has the composition comprising of:
(a) zeolite from 1 wt % to 65 wt %; (b) clay from 10 wt % to 75 wt %; (c) silica from 25 wt % to 80 wt %; (d) alumina from 20 wt % to 70 wt %; (e) phosphate from 4 wt % to 23 wt %; and (f) Group-IIA or Group IB bivalent metals from 0.1 to 1 wt %.

Another embodiment of the present invention provides a process as herein described wherein the FCC catalyst additive has the composition comprising of:
(a) zeolite from 1 wt % to 65 wt %; (b) clay from 10 wt % to 75 wt %; (c) silica from 25 wt % to 80 wt %; (d) alumina from 20 wt % to 70 wt %; (e) phosphate from 4.5 wt % to 22 wt %; and (f) Group-IIA or Group IB bivalent metals from 0.1 to 1 wt %.

Another embodiment of the present invention provides a process as herein described wherein in step (e) the acid site of zeolite in FCC catalyst additive is replaced by bivalent metal selected from Group-IIA or Group-IB bivalent metals.

Another embodiment of the present invention provides a process as herein described wherein in step (e) the bivalent metal selected from Group-IIA or Group-IB generates moderate acid sites on the catalyst to improve selectivity towards high value hydrocarbons but suppress low value components like Dry Gas (DG) as well as to improve gasoline octane and bottoms.

Another embodiment of the present invention provides a product of FCC catalyst additive having the following composition:
(a) zeolite from 1 wt % to 65 wt %; (b) clay from 10 wt % to 75 wt %; (c) silica from 25 wt % to 80 wt %; (d) alumina from 20 wt % to 70 wt %; (e) phosphate from 4 wt % to 23 wt %; and (f) Group-IIA or Group IB metals from 0.1 to 1 wt %.

DETAIL DESCRIPTION

While the invention is susceptible to various modifications and/or alternative processes and/or compositions, specific embodiment thereof has been shown by way of example in the drawings and tables and will be described in detail below. It should be understood, however that it is not intended to limit the invention to the particular processes and/or compositions disclosed, but on the contrary, the invention is to cover all modifications, equivalents, and alternative falling within the spirit and the scope of the invention as defined by the appended claims.

The tables and protocols have been represented where appropriate by conventional representations, showing only those specific details that are pertinent to understanding the embodiments of the present invention so as not to obscure the disclosure with details that will be readily apparent to those of ordinary skill in the art having benefit of the description herein.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

Definitions:

The term "Bivalent metals" as used in the context of the present invention means metals which fall within the scope of Group IIA and/or Group IB of the periodic table. The "Bivalent metals" as herein described in the present invention are those metals which replace the phosphate from the acid sites of zeolite of the Fluidic Catalytic Cracking (FCC) catalyst, thereby reducing the concentration of phosphate in the FCC. The "Bivalent metals" as herein described in the present invention consisting of Group IIA and/or Group IB when loaded on the catalyst creates moderate acid sites which improve the selectivity of high value hydrocarbons such as propylene and gasoline and simultaneously supresses the low value components such as dry gas (DG) and bottoms.

The term "Bottoms/Bottom" as used in the context of the present invention means unconverted residue heavy hydrocarbon having boiling point above 370° C.

The term "Improved FCC catalyst additive or Improved FCC catalyst additive with depleted phosphate" or "FCC catalyst additive", as used in the context of the present invention means a FCC catalyst additive from which phosphate has been significantly removed in the range of 5-10 wt % by water treatment. Further "Improved FCC catalyst additive or Improved FCC catalyst "FCC catalyst additive" additive with depleted phosphate" as used in the context of the present invention also means FCC catalyst additive wherein phosphate in the range of 5-10 wt % is depleted when treated with aqueous medium at a temperature of 25 to 99° C. and followed by impregnated with 0.1-1% of IIA and/or IB group metals wherein the replacement of phosphate with bivalent metals takes place at the active site of the zeolite of the FCC catalyst additive.

The term "Metal Impregnation" as used in the context of the present invention means a methodology to load the desired amount of selected metal precursor on the catalyst.

The term "Acidic Binder" as used in the context of the present invention means a binder prepared by the reaction of clay slurry with required quantity of phosphoric acid.

The term "Slurrying of a conventional FCC catalyst additive" as used in the context of the present invention means treating the FCC catalyst additive in demineralised water.

The term "de-mineralized water or demineralized water" as used in the context of the present invention means demineralised water is pure water that has minerals removed and is usually obtained through distillation or deionisation.

The term "soluble phosphate" as used in the context of the present invention means the phosphate (loaded on FCC catalyst additive) which is soluble slurring with demineralised water at the temperature in the range of 25-99° C. from 30 min to 2 h.

The present invention describes a novel process of preparing a FCC catalyst additive composition having reduced amount of soluble water phosphate suitable for cracking heavy hydrocarbons as well as enhancing yield of heavy hydrocarbons. More specifically one aspect of the present invention also provides novel process of preparing a FCC catalyst additive composition with reduced amount of water soluble phosphate suitable for cracking Liquefied Petroleum Gas (LPG) as well as enhancing yield of LPG. Another aspect of the present invention provides a suitable catalyst product for cracking of heavy hydrocarbon feed stocks predominantly in to light olefins.

Thus in one aspect of the present invention provides novel process of preparing FCC catalyst additive composition which involves the removal of excess water of soluble phosphate by controlled wash using de-mineralized water as media on spray dried calcined FCC additive. More specifically the present invention provides a novel process of preparing a FCC catalyst additive composition which involves the removal of water soluble phosphate by controlled wash using de-mineralized water as media on spray dried calcined ZSM-5 additive In one aspect the present invention provides a process of preparing a FCC catalyst additive composition with low phosphate or negligible phosphate which has adequate Apparent Bulk Density (ABD), Attrition Index (AI), enhanced catalytic activity and hydrocarbon selectivity. In another aspect the present invention provides a process of preparing a FCC catalyst additive composition having low phosphate or negligible phosphate which is having adequate ABD, attrition index, enhanced catalytic activity and LPG selectivity.

In one aspect the present invention provides removal of excess phosphate from a FCC catalyst additive composition having following composition:
(a) Zeolite from 1 wt % to 65 wt %,
(b) Clay from 10 wt % to 75 wt %,
(c) Silica from 25 wt % to 80 wt %,
(d) Alumina from 20 wt % to 70 wt %, and
(e) Phosphate from 5 wt % to 25 wt %.

One more aspect of the present invention provides a phosphate depleted FCC catalyst additive composition is having following composition:
(i) zeolite from 1 wt % to 65 wt %;
(ii) clay from 10 wt % to 75 wt %;
(iii) silica from 25 wt % to 80 wt %;
(iv) alumina from 20 wt % to 70 wt %;
(v) phosphate from 4 wt % to 23 wt %; and
vi) Group-IIA or Group IB bivalent metals from 0.1 to 1 wt %.

Another aspect of the present invention provides a process of preparing Fluidic Catalytic Cracking (FCC) catalyst additive composition, wherein the said process reduces the concentration of phosphate in the FCC catalyst in the range of 8-12%, more specifically about 9%. In yet another aspect the present invention provides a FCC catalyst additive composition having 8-12% less phosphate, more specifically about 9% less phosphate, than the original concentration of phosphate as present in the initial FCC catalyst additive composition.

In one aspect the present invention provides conventional FCC catalyst additive having pentasil family zeolite selected from ZSM-5, ZSM-11, ZSM-12, ZSM-23, ZSM-35, ZSM-38, ZSM-48, ZSM-57, Zeolite beta, and mordenite; clay; phosphate; alumina; and silica.

In Another aspect generally a zeolite of FCC catalyst additive of the present invention provides ZSM-5 additive which uses phosphate to stabilize the acid sites of ZSM-5 zeolite as well as acts as a binder to improve the (ABD) and Attrition Resistance (AI) of ZSM-5 additive. Therefore during preparation of ZSM-5 additive, excessive phosphate is always present in the final additive formulation which has a detrimental effect on active component of Y zeolite present in the FCC catalyst.

One aspect of the present invention provides that FCC additive catalyst composition may be prepared by first treating the high silica low soda medium pore zeolite with alkaline component and optionally with a phosphate compound to obtain zeolite slurry having a pH in the range of about 5-9. The resulting product can have phosphate in the range of about 1 wt % to 20 wt %, prior to the introduction of acidic binder. The stabilized zeolite is then treated with acidic clay slurry including, for example, a clay-phosphate slurry, a clay-phosphate-silica-alumina slurry, a clay-phosphate-silica slurry, a clay-phosphate-alumina slurry, and subsequently spray dried. The clay can include kaolin, halloysite, and mixtures of these components.

Another aspect of the present invention provides a phosphate source selected from phosphoric acid, ammonium dihydrogen phosphate, ammonium monohydrogen phosphate, triammonium phosphate, and mixtures thereof. The alumina can include amorphous gel alumina, aluminum rehydrates, pseudoboehmite alumina, bayrite alumina, gamma alumina, and mixtures thereof. The silica can be in colloidal form having a mean diameter ranging from about 4 nm to about 90 nm, and the product having the lowest residual soda below about 0.3 wt %. In another aspect the binder used in preparing the catalyst can be slurry of clay with a phosphate source and may contain silica, alumina, or both in varying proportions.

In another aspect the present invention provides an acid used for acidifying colloidal silica which is selected from nitric acid, hydrochloric acid, formic acid and acetic acid or a mixture thereof. The dilute acid used for treating alumina can include nitric acid, hydrochloric acid, formic acid and acetic acid and mixtures thereof.

Another aspect of the present invention relates to a process for preparing a cracking catalyst composition for cracking heavy hydrocarbon, comprising, slurrying of a conventional FCC catalyst additive in demineralised water, solubilising excess water soluble phosphate, recovering phosphate depleted catalyst and drying the same, modifying the acid sites by exchanging with bivalent metal ions, and drying and calcining to obtain a catalyst additive of the present invention.

In the one aspect the present invention provides a process of preparing an improved FCC catalyst additive composition in which phosphate has been depleted. The process of the present invention as herein described provides that FCC catalyst additive is washed with demineralized water to remove excess of phosphate. More specifically, the present invention provides that during washing of the FCC catalyst additive with de-mineralized water, it is pentasil zeolite of the FCC catalyst additive, from which excess of phosphate is removed. The excess of phosphate which is removed from the FCC catalyst additive, more specifically from the zeolite of the FCC catalyst additive is in the range of 5 wt % to 10 wt %.

Another aspect of the present invention provides that during washing of the commercially available pentasil zeolite based FCC catalyst additive with de-mineralized water removes excess water soluble phosphate ranging from 5 wt % to 10 wt % on the basis of total phosphate present in the initial pentasil zeolite additive to improve the product selectivity.

In another aspect the present invention provides a process is carried out by slurring the FCC catalyst additive in demineralized water at a temperature in the range of 25° C. to 25° C. for a time period of 1 minutes to 60 minutes, wherein the ratio of catalyst to water is from 1:1 to 1:10. More specifically another aspect of the present invention provides a process as herein described which removes or depletes excess of soluble phosphate in the range of 5 to 10 wt % from the FCC catalyst additive, wherein the additive is slurred with demineralized water at a temperature in the range of 25° C. to 25° C. for a time period of 1 minutes to 60 minutes, wherein the ratio of catalyst to water is from 1:1 to 1:10.

Another aspect of the present invention provides that after the removal of excess of phosphate from the FCC catalyst additive, particularly from the pentasil zeolite of the FCC catalyst additive, the acid sites on the pentasil zeolite is replaced by bi-valent metals selected from the group consisting of Group-IIA and Group-IB to improve selectivity towards high value hydrocarbons particularly propylene and gasoline and to lower or supress the yields of low value components like dry gas and bottoms.

More specifically another aspect of the present invention provides the process as herein described wherein at the active sites of the pentasil zeolite the phosphate is exchanged or replaced by bivalent metal wherein bivalent metal is selected from Group-IIA and Group-IB wherein the said group generates moderate acid on the catalyst to improve selectivity towards high value hydrocarbons, like propylene and gasoline and to suppress low value components like DG and bottoms.

One more aspect of the present invention provides a phosphorous depleted FCC catalyst additive suitable for improving the selectivity of the said additive towards high value components like propylene and gasoline and to suppress low value components like DG and bottoms and methods of preparing such phosphorous depleted FCC.

Another aspect of the present invention relates to a process for the preparation of LPG selective catalyst particles comprising a medium pore zeolite bonded with clay-phosphate-silica-alumina binder.

Another objective of the present invention is to removal of excess phosphate present in the additive formulation which has a detrimental effect on active component of Y zeolite present in the FCC catalyst to improve high value product selectivity.

Further, another objective of the present invention is to modification of acid sites of additive after removal of excess phosphate with bi-valent metals selected from Gr-IIA and G-IB in such a way that selectivity towards high value components like propylene and gasoline increases and low value components like dry gas and bottoms decreases.

Accordingly, the main embodiment of the present invention provides a process for preparing a Fluidic Cracking Catalyst (FCC) catalyst additive composition for cracking heavy hydrocarbon, said process comprising the steps of:
- (a) slurrying of a conventional FCC catalyst additive in demineralised water at a temperature of 2525° C. to 9925° C. for 30 mins.-to 2 hrs for solubilising un-reacted phosphate;
- (b) filtering the phosphate depleted FCC catalyst additive;
- (c) drying and calcinating the FCC catalyst additive of step (b);
- (d) exchanging of the FCC catalyst additive of step (c) with the solution of bivalent metals from group consisting of Group IIA or Group IB at a temperature of 60-80° C.;
- (e) filtering the metal exchanged FCC catalyst additive;
- (f) drying and calcinating the metal exchanged FCC catalyst additive of step (e); and
- (g) obtaining FCC catalyst additive composition.

Another embodiment of the present invention provides a product of FCC catalyst additive having the following composition:
(a) zeolite from 1 wt % to 65 wt %; (b) clay from 10 wt % to 75 wt %; (c) silica from 25 wt % to 80 wt %; (d) alumina from 20 wt % to 70 wt %; (e) phosphate from 4 wt % to 23 wt %; and (f) Group-IIA and Group IB metals from 0.1 to 1 wt %.

Another embodiment of the present invention provides a FCC additive catalyst composition as herein described which has no soluble phosphate when treated with Demineralised water.

Another embodiment of the present invention provides a process as herein described wherein the heavy hydrocarbons consist of LPG and gasoline.

Another embodiment of the present invention provides a process as herein described wherein in the step (a) the reaction is preferably carried out of at a temperature of 80° C. for 2 hrs.

Another embodiment of the present invention provides a process as herein described wherein the metals impregnated in metal impregnation step (d) consist of Nickel at a concentration of 2800 ppm and Vanadium at a concentration of 6500 pm.

Another embodiment of the present invention provides a process as herein described wherein step (a) removes excess of soluble phosphate in the range of 5 to 10 wt %.

Another embodiment of the present invention provides a process as herein described wherein step (a) the FCC to water ratio in the range of 1:10 to 10:1.

Another embodiment of the present invention provides a process as herein described wherein the FCC catalyst additive is a conventional catalyst having pentasil family zeolite selected from ZSM-5, ZSM-11, ZSM-12, ZSM-23, ZSM-35, ZSM-38, ZSM-48, ZSM-57, Zeolite beta, and mordenite.

Another embodiment of the present invention provides a process as herein described the FCC catalyst additive selected for removal of excess phosphate is having following:
(a) zeolite from 1 wt % to 65 wt %; (b) clay from 10 wt % to 75 wt %; (c) silica from 25 wt % to 80 wt %; (d) alumina from 20 wt % to 70 wt %; and (e) phosphate from 5 wt % to 25 wt %.

Another embodiment of the present invention provides a process as herein described wherein the FCC catalyst additive has the composition comprising of:
(a) zeolite from 1 wt % to 65 wt %; (b) clay from 10 wt % to 75 wt %; (c) silica from 25 wt % to 80 wt %; (d) alumina from 20 wt % to 70 wt %; (e) phosphate from 4 wt % to 23 wt %; and (f) Group-IIA or Group IB bivalent metals from 0.1 to 1 wt %.

Another embodiment of the present invention provides a process as herein described wherein the FCC catalyst additive has the composition comprising of:
(a) zeolite from 1 wt % to 65 wt %; (b) clay from 10 wt % to 75 wt %; (c) silica from 25 wt % to 80 wt %; (d) alumina from 20 wt % to 70 wt %; (e) phosphate from 4.5 wt % to 22 wt %; and (f) Group-IIA or Group IB bivalent metals from 0.1 to 1 wt %.

Another embodiment of the present invention provides a process as herein described wherein in step (e) the acid site of zeolite in FCC catalyst additive is replaced by bivalent metal selected from Group-IIA or Group-IB bivalent metals.

Another embodiment of the present invention provides a process as herein described wherein in step (d) the bivalent metal selected from Group-IIA or Group-IB generates moderate acid sites on the catalyst to improve selectivity towards high value hydrocarbons but suppress low value components like Dry Gas (DG) as well as to improve gasoline octane and bottoms.

Another embodiment of the present invention provides a process as herein described wherein the step (a) the concentration of bivalent metal exchanged on acid sites of zeolite sites of FCC catalyst additive is in the range of 0.1 to 1 wt % of bivalent metal.

Another embodiment of the present invention provides a process as herein described wherein FCC catalyst additive has no soluble phosphate when treated with demineralised water in step (a).

Yet another embodiment of the present invention provides a process for cracking of heavy hydrocarbon comprising contacting the heavy hydrocarbon in the presence of FCC as here described to obtain light olefins with improved selectivity towards high value components selected from propylene and gasoline and suppressing low value components like DG and bottoms.

Yet another embodiment of the present invention provides a process as herein described wherein step (d) the acid site of zeolite of the FCC is replaced by bivalent metal selected magnesium, copper or calcium.

Another embodiment of the present invention provides a process as herein described wherein step (d) the bivalent metal selected from calcium, magnesium or copper generates moderate acid sites on the catalyst to improve selectivity towards high value hydrocarbons but suppress low value components like DG and bottoms.

Another embodiment of the present invention provides a process as herein described wherein in the step (d) the concentration of calcium, magnesium or copper exchanged on acid sites of zeolite sites of FCC is in the range of 0.1 to 1 wt % of bivalent metal.

Another embodiment of the present invention provides a process for preparing a Fluidic Cracking Catalyst additive (FCC) for enhancing liquefied petroleum gas, said process comprising the steps of:
- (a) slurrying of a conventional FCC catalyst additive in demineralised water at a temperature of 25° C. to 99° C. for 30 mins.-to 2 hrs for solubilising un-reacted phosphate;
- (b) filtering the phosphate depleted FCC catalyst additive;
- (c) drying and calcinating the FCC catalyst additive of step (b);

(d) exchanging of the FCC catalyst additive of step (c) with the solution of bivalent metals from group consisting of magnesium, copper or calcium at a temperature of 60-80° C.;
(e) filtering the metal exchanged FCC catalyst additive;
(f) drying and calcinating the metal exchanged FCC catalyst additive of step (e); and
(g) obtaining FCC catalyst additive composition.

Another embodiment of the present invention provides a process for preparing a Fluidic Cracking Catalyst additive (FCC) for enhancing liquefied petroleum gas, said process comprising the steps of:
(a) slurrying of a conventional FCC catalyst additive in demineralised water at a temperature of 25° C. to 99° C. for 30 mins.-to 2 hrs for solubilising un-reacted phosphate;
(b) filtering the phosphate depleted FCC catalyst additive;
(c) drying and calcinating the FCC catalyst additive of step (b);
(d) exchanging of the FCC catalyst additive of step (c) with the solution of bivalent metals from group consisting of Group-IIA at a temperature of 60-80° C.;
(e) filtering the metal exchanged FCC catalyst additive;
(f) drying and calcinating the metal exchanged FCC catalyst additive of step (e); and
(g) obtaining FCC catalyst additive composition.

Another embodiment of the present invention provides a process for preparing a Fluidic Cracking Catalyst additive (FCC catalyst) for enhancing liquefied petroleum gas, said process comprising the steps of:
(a) slurrying of a conventional FCC catalyst additive in demineralised water at a temperature of 25° C. to 99° C. for 30 mins.-to 2 hrs for solubilising un-reacted phosphate;
(b) filtering the phosphate depleted FCC catalyst additive;
(c) drying and calcinating the FCC catalyst additive of step (b);
(d) exchanging of the FCC catalyst additive of step (c) with the solution of bivalent metals from group consisting of Group-IB at a temperature of 60-80° C.;
(e) filtering the metal exchanged FCC catalyst additive;
(f) drying and calcinating the metal exchanged FCC catalyst additive of step (e); and
(g) obtaining FCC catalyst additive composition.

Another embodiment of the present invention provides a process for preparing a Fluidic Cracking Catalyst (FCC) for enhancing liquefied petroleum gas, said process comprising the steps of:
(a) slurrying of a conventional FCC catalyst additive in demineralised water at a temperature of 25° C. to 99° C. for 30 mins.-to 2 hrs for solubilising un-reacted phosphate;
(b) filtering the phosphate depleted FCC catalyst additive;
(c) drying and calcinating the FCC catalyst additive of step (b);
(d) exchanging of the FCC catalyst additive of step (c) with the solution of bivalent metals from group consisting of Group-IIA and Group IB at a temperature of 60-80° C.;
(e) filtering the metal exchanged FCC catalyst additive;
(f) drying and calcinating the metal exchanged FCC catalyst additive of step (e); and
(g) obtaining FCC catalyst additive composition.

Another embodiment of the present invention provides a process as herein described wherein step (d) the bivalent metal selected from Group-IIA or Group-IB generates moderate acid sites on the catalyst to improve selectivity towards high value hydrocarbons selected from propylene and gasoline and suppressing low value components like DG and bottoms.

Yet another embodiment of the present invention provides a process as herein described wherein step (d) the zeolite acid sites of phosphate depleted FCC is metal exchanged with a bivalent metal selected from Group-IIA and Group-IB to generate moderate acid sites on the catalyst to improve the selectivity towards high value components like propylene and gasoline and suppressing low value components like DG and bottoms One more embodiment of the present invention provides a process as herein described wherein step (d) the zeolite acid sites of phosphate depleted final FCC is metal exchanged by 0.1 to 1 wt % of a bi-valent metal selected from Group-IIA and Group-IB to generate moderate acid sites on the catalyst to improve the selectivity towards high value components like propylene and gasoline and suppressing low value components like DG and bottoms.

Another embodiment of the present invention provides a process as herein described wherein the FCC composition has 8-12% less phosphate than present in the original FCC composition.

Another embodiment of the present invention provides a process as herein described wherein the FCC composition has 9% less phosphate than present in the original FCC composition.

Another embodiment of the present invention provides a product of FCC catalyst additive having the following composition:
(a) zeolite from 1 wt % to 65 wt %; (b) clay from 10 wt % to 75 wt %; (c) silica from 25 wt % to 80 wt %; (d) alumina from 20 wt % to 70 wt %; (e) phosphate from 4 wt % to 23 wt %; and (f) Group-IIA or Group IB metals from 0.1 to 1 wt %.

The invention will now be explained with the help of following examples. However, the scope of the invention should not be limited to these examples as the person skilled in the art can easily vary the proportion of the ingredients and combinations.

EXAMPLES

Example 1

Catalyst Prepared as Per Example-7 of U.S. Pat. No. 7,517,827

98.63 gm of Pural SB grade alumina (having loss on ignition of 23.96 wt %) was made into a slurry with 425 gm of Demineralised (DM) water. The slurry was peptized with 21.52 gm of formic acid (85% concentration). 426.7 gm of ZSM-5 zeolite (loss on ignition 12.12 wt %) having silica to alumina molar ratio of 30 was made into a slurry with 490 gm of 10% ammoniacal solution followed by addition of 27.7 gm phosphoric acid (85%) to produce a zeolite slurry having pH of 7.8. 1022.45 gm of kaolin clay (having loss on ignition 14.91 wt %) was made into a slurry with 1107 gm DM water and kept under vigorous stirring while 191.53 gm of ortho-phosphoric acid (concentration 85 wt %) was added. Earlier prepared alumina gel and zeolite slurry were added to the clay-phosphate slurry one after another under vigorous stirring. Final slurry having a pH of about 2.63 was spray dried in a counter current spray drier having two fluid nozzle. Spray dried product was calcined at 500° C.

Calcined catalyst showed ABD of 0.76 g/cc and attrition index of 4.3. Calcined catalyst was impregnated with 2800 ppm of Nickel and 6500 ppm of Vanadium and steam deactivated at 750° C. for three hours.

Steam deactivated catalyst was evaluated in an ACE micro reactor employing a resid FCC feed having physical properties shown in Table 1. For performance evaluation, 5 wt % of ZSM-5 additive was mixed with 95 wt % equilibrated RFCC catalysts and conducted reaction at a temperature of 510° C. in ACE MAT unit. Physical properties along with performance results are shown in a Table 2A and 2B.

Example 2

100 gm of catalyst prepared as per Example 1, was dispersed 1000 ml of demineralised water at a temperature of 85° C. and kept under stirring for 30 minutes for removing water soluble phosphate. Washed additive catalyst was recovered by filtration, oven dried at 120° C. for 4 hrs, calcined the oven dried catalyst at 550° C. for 21 hrs. Phosphate content in both fresh catalyst and washed catalyst was measured respectively as 12 wt % and 11.03 wt %. This catalyst was subjected to metal impregnation (Ni=2800 ppm and V=6500 ppm) followed by steam deactivation protocol before performance evaluation. For performance evaluation, 5 wt % of this ZSM-5 additive was mixed with 95 wt % equilibrated RFCC catalysts and conducted reaction at a temperature of 510° C. in ACE MAT unit. Physical properties along with performance results are shown in a Table 2A and 2B.

Example 3

100 gm of phosphate washed catalyst prepared as per Example-2, was dispersed 1000 ml of demineralised water containing 0.5 wt % magnesium (sourced from magnesium nitrate) and exchanged for two hrs at a temperature of 80° C. After that magnesium exchanged additive catalyst was recovered by filtration, oven dried at 120° C. for 4 hrs and calcined at 550° C. for 2 hrs to obtain improved catalyst of present invention. This catalyst was subjected to metal impregnation (Ni=2800 ppm and V=6500 ppm) followed by steam deactivation protocol for performance evaluation. For performance evaluation, 5 wt % of this ZSM-5 additive was mixed with 95 wt % equilibrated RFCC catalysts and conducted reaction at a temperature of 510° C. in ACE MAT unit. Physical properties along with performance results are shown in a Table 2A and 2B.

Example-4

100 gm of phosphate washed catalyst prepared as per Example-2, was dispersed 1000 ml of demineralised water containing 0.5 wt % calcium (sourced from calcium nitrate) and exchanged for two hrs at a temperature of 80° C. After that calcium exchanged additive catalyst was recovered by filtration, oven dried at 120° C. for 4 hrs and calcined at 550° C. for 2 hrs to obtain improved catalyst of present invention. This catalyst was subjected to metal impregnation (Ni=2800 ppm and V=6500 ppm) followed by steam deactivation protocol for performance evaluation. For performance evaluation, 5 wt % of this ZSM-5 additive was mixed with 95 wt % equilibrated RFCC catalysts and conducted reaction at a temperature of 510° C. in ACE MAT unit. Physical properties along with performance results are shown in a Table 2A and 2B.

Example-5

100 gm of phosphate washed catalyst prepared as per Example-2, was dispersed 1000 ml of demineralised water containing 0.5 wt % copper (sourced from copper nitrate) and exchanged for two hrs at a temperature of 80° C. After that copper exchanged additive catalyst was recovered by filtration, oven dried at 120° C. for 4 hrs and calcined at 550° C. for 2 hrs to obtain improved catalyst of present invention. This catalyst was subjected to metal impregnation (Ni=2800 ppm and V=6500 ppm) followed by steam deactivation protocol for performance evaluation. For performance evaluation, 5 wt % of this ZSM-5 additive was mixed with 95 wt % equilibrated RFCC catalysts and conducted reaction at a temperature of 510° C. in ACE MAT unit. Physical properties along with performance results are shown in a Table 2A & 2B Properties of Feed Employed for Performance Evaluation of Catalyst Prepared Under Examples-1 to 5 is Given Below Table-1:

TABLE 1

| Sr No | Attributes | Unit | Value |
|---|---|---|---|
| | Feed properties | | |
| 1 | Density @ 15° C. | g/cc | 0.887 |
| 2 | Kinematic Viscosity @ 100° C. | Cst | 7.4 |
| 3 | Distillation, D-1160 | | |
| 4 | IBP | ° C. | 162 |
| 5 | 5% | ° C. | 267 |
| 8 | 30% | ° C. | 370 |
| 9 | 50% | ° C. | 409 |
| 10 | 70% | ° C. | 457 |
| 11 | Sulphur | wt % | 1.72 |
| 1 | Total N2 | ppm | 860 |
| 13 | CCR | wt % | 3.3 |
| 14 | V | ppm | 23 |
| 15 | Ni | ppm | 9 |
| 16 | Na | ppm | 1.8 |
| 17 | Fe | ppm | 2.4 |

Physicochemical Properties & Performance Data of Additive Prepared as Per Examples 1 to 5 are Given in Table-2A & 2B

TABLE 2A

Performance results of additive prepared as per examples 1 to 5

| | Base + 5 wt % Additive of Example-1 | Base + 5 wt % Additive of Example-2 | Base + 5 wt % Additive of Example-3 | Base + 5 wt % Additive of Example-4 | Base + 5 wt % Additive of Example-5 |
|---|---|---|---|---|---|
| Cat/oil | 6.02 | 6.02 | 6.02 | 6.02 | 6.02 |
| Conversion, 216 | 79.54 | 79.71 | 81.83 | 83.14 | 82.71 |
| Coke | 8.32 | 7.8 | 7.85 | 7.43 | 7.61 |
| DG | 2.86 | 2.87 | 2.6 | 2.72 | 2.79 |
| LPG | 30.91 | 29.08 | 31.88 | 34.31 | 33.04 |
| Propylene | 9.70 | 9.72 | 10.57 | 11.68 | 10.92 |
| Gasoline (C5-150) | 27.99 | 31.59 | 32.05 | 31.55 | 32.04 |
| HN (150-220) | 9.45 | 8.46 | 7.45 | 7.13 | 7.23 |
| LCO (220-370) | 16.65 | 16.39 | 14.64 | 13.62 | 13.84 |
| Bottom (370+) | 3.82 | 3.81 | 3.53 | 3.24 | 3.45 |

TABLE 2B

Additive composition and their physical properties

| | Additive Example-1 | Additive Example-2 | Additive Example-3 | Additive Example-4 | Additive Example-5 |
|---|---|---|---|---|---|
| Additive composition | | | | | |
| PSB, wt % | 5 | 5.06 | 5.03 | 5.03 | 5.03 |
| Zeolite, wt % | 25 | 25.28 | 25.15 | 25.15 | 25.15 |
| Clay, wt % | 58 | 58.64 | 58.35 | 58.35 | 58.35 |
| H3PO4 (as PO4), wt % | 12 | 11.02 | 10.97 | 10.97 | 10.97 |
| Mg, wt % | 0 | 0 | 0.5 | | |
| Ca, wt % | 0 | 0 | | 0.5 | |
| Cu, wt % | 0 | 0 | | | 0.5 |
| Additive Physical properties | | | | | |
| ABD, gm/cc | 0.78 | 0.77 | 0.78 | 0.77 | 0.78 |
| Attrition Index | 3.5 | 3.6 | 3.4 | 3.5 | 3.7 |

The invention claimed is:

1. A process for preparing a Fluidic Catalytic Cracking (FCC) catalyst additive composition for cracking heavy hydrocarbon, said process comprising the steps of:
   (a) slurrying of an initial FCC catalyst additive in demineralised water at a temperature of 25° C. to 99° C. for 30 mins. to 2 hrs for solubilising excess phosphate present in the initial FCC catalyst additive; wherein the initial FCC catalyst additive comprises: (a) zeolite from 1 wt % to 65 wt %; (b) clay from 10 wt % to 75 wt %; (c) silica from 25 wt % to 80 wt %; (d) alumina from 20 wt % to 70 %; and (e) phosphate from 5 wt % to 25 wt %;
   (b) filtering the slurry of step (a) and obtaining phosphate depleted FCC catalyst additive;
   (c) drying and calcinating the FCC catalyst additive of step (b);
   (d) dispersing the FCC catalyst additive of step (c) in a solution of bivalent metals selected from the group consisting of Group IIA or Group IB at a temperature of 60-80° C. for exchanging or replacing zeolite acid sites of said FCC catalyst additive by the bivalent metal, wherein the bivalent metal generates moderate acid sites on the FCC catalyst additive of step (c);
   (e) filtering the additive from step (d);
   (f) drying and calcinating the metal exchanged FCC catalyst additive of step (e); and
   (g) obtaining the FCC catalyst additive composition.

2. The process as claimed in claim 1, wherein step (a) is carried out at a temperature of 80° C. for 2 hrs.

3. The process as claimed in claim 1, wherein the initial FCC catalyst additive is a pentasil family zeolite selected from ZSM-5, ZSM-11, ZSM-12, ZSM-23, ZSM-35, ZSM-38, ZSM-48, ZSM-57, Zeolite beta, and mordenite.

4. The process as claimed in claim 1, wherein the FCC catalyst additive composition obtained in step (g) is:
   (a) zeolite from 1 wt % to 65 wt %; (b) clay from 10 wt % to 75 wt %; (c) silica from 25 wt % to 80 wt %; (d) alumina from 20 wt % to 70 wt %; (e) phosphate from 4 wt % to 23 wt % ; and (f) Group-IIA or Group TB bivalent metals from 0.1 to 1 wt %.

5. The process as claimed in claim 1, wherein in step (d) the concentration of bivalent metal exchanged on acid sites of zeolite sites of FCC catalyst additive is in the range of 0.1 to 1 wt % of bivalent metal.

* * * * *